S. G. CABELL.

Assignor, by mesne assignments, to L. ABBETT & D. JACKSON.

Fluting-Machine.

No. 8,453. Reissued Oct. 15, 1878.

Attest:
H. D. Perrine
Clinton Coombs

Inventor,
S. G. Cabell,
By J. J. Coombs,
Attorney.

N. PETERS, PHOTO-LITHOGRAPHER, WASHINGTON, D. C.

UNITED STATES PATENT OFFICE.

SAMUEL G. CABELL, OF WASHINGTON, DISTRICT OF COLUMBIA, ASSIGNOR, BY MESNE ASSIGNMENTS, TO LEON ABBETT AND DANIEL JACKSON.

IMPROVEMENT IN FLUTING-MACHINES.

Specification forming part of Letters Patent No. 56,365, dated July 17, 1866; Reissue No. 3,856, dated March 1, 1870; Reissue No. 8,453, dated October 15, 1878; application filed August 27, 1878.

*To all whom it may concern:*

Be it known that I, SAMUEL G. CABELL, late of Quincy, in the county of Adams and State of Illinois, and now of Washington, District of Columbia, have invented certain new and useful Improvements in Fluting or Crimping Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use said invention, I will proceed to describe it.

The nature of this invention consists in certain improvements in the construction of machines for fluting linens, laces, &c., as hereinafter more fully explained.

Figure 1:
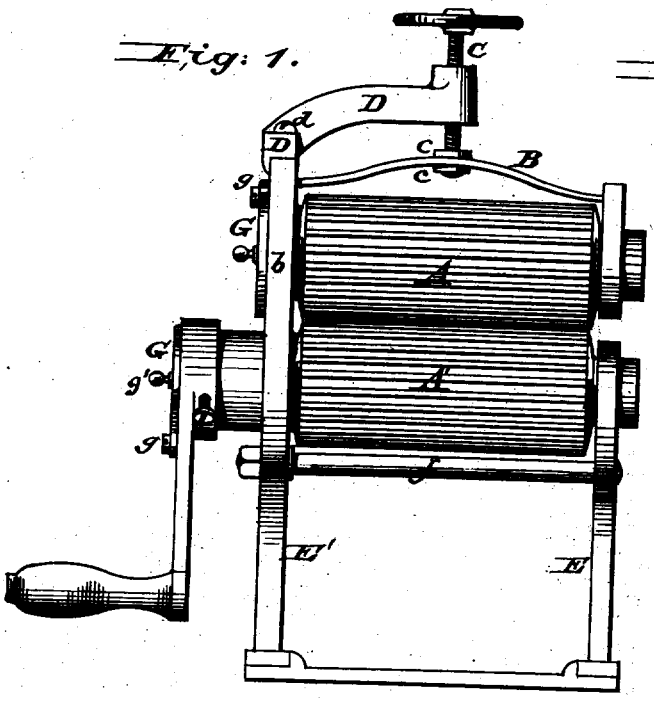
Figure 2:
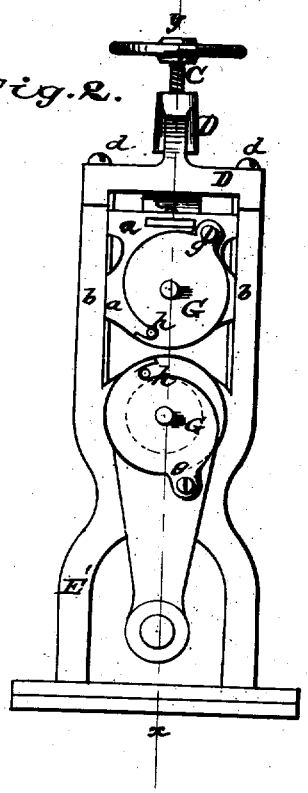

In the drawing, Figure 1 is a rear elevation of the improved machine complete, ready for use. Fig. 2 is an end view, and Fig. 3 is a longitudinal vertical section taken on the lines *x y* of Fig. 2.

In all machines of this character heretofore made there have been some objectionable features which rendered them difficult to use. In some the upper roller has its supports so arranged that a long strip of fabric cannot be passed straight through between the rolls, the support being in the way. In others the upper roll, instead of being mounted so that it can be raised bodily, is so arranged that it rests constantly on the lower roll. Others, again, have the rolls mounted in duplicate bearings at one end only, while they are not usually provided with any means for closing the end of the hollow rolls to prevent the escape of the heat, and also to prevent burning the hand at the end while operating the machine.

The object of this invention is to remedy these and other difficulties, and to provide a simple, efficient, and cheap machine for general or family use.

Figure 3:
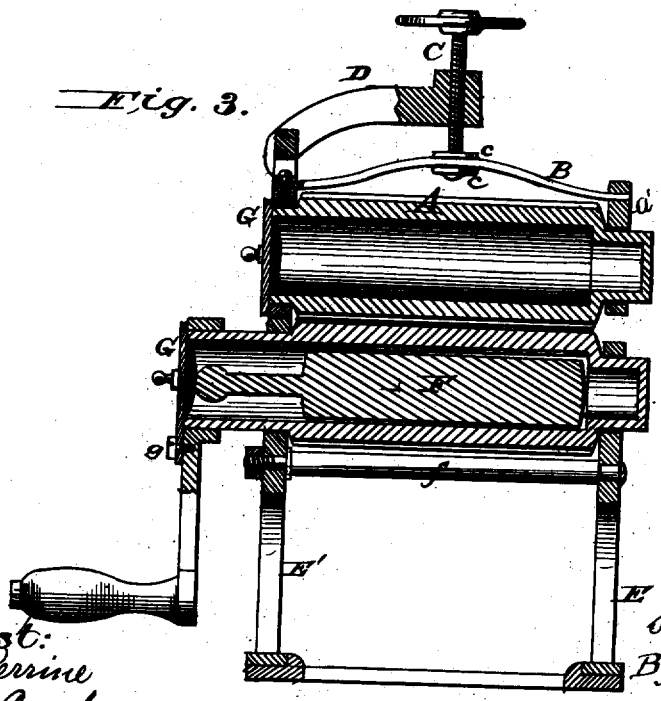

In constructing the improved machine a frame is first provided, consisting of a base having two uprights, E and E′, one at each end, the first rising high enough to form a bearing for one end of the lower roll, as shown by E in Figs. 1 and 3, the other one, E′, being made high enough to form a bearing for the upper roll, and also to support an arm, D, from which the upper roll is suspended and adjusted.

The upright E′ is made at its upper end with an opening large enough to receive and guide a sliding box or collar, *a*, as shown in Fig. 2, the edges of the box *a* having grooves formed in them which engage with and slide on the side pieces *b* of the upper part of the upright E′. The sliding box *a* has a hole made in it to receive the journaled end of the upper roll, A. The opposite end of the roll A is also journaled in a similar box or bearing, *a′*; but this latter, instead of being mounted in an upright, like the former, is attached to the end of a spring cross-bar, B, which has its opposite end secured to the sliding box, *a*, one of the boxes being detachable from the cross-bar to enable the roll to be mounted therein, it being the sliding box *a* in this case, to which the spring-bar B is thus attached by entering a mortise in the box and being secured there by a screw, as shown in Fig. 3.

Through the overhanging arm D a screw, C, passes, its lower end entering a slot in the spring-bar B, to which it is connected loosely by a washer, *c*, both above and below the bar, as shown in Figs. 1 and 3, this screw C thus serving to connect the bar B with its attached boxes, *a* and *a′*, which together form a yoke to the arm D overhead, and thereby suspending the upper roll from the arm D. It will therefore be seen that by turning the screw C, which has a hand-wheel for the purpose, the upper roll, A, can be raised clear from the lower roll, or can be pressed down upon it with any desired degree of pressure. By this arrangement of parts it will also be seen that the roll is supported in bearings at each end, one of which serves to guide the roll in its movements up and down and prevent it from getting out of line with the lower roll; and, further, that by arranging the arm D in the manner shown it is entirely out of the way, and thus leaves an unobstructed passage-way for the fabric, in a straight line through between the rolls, of an unlimited extent.

The lower roll is mounted in fixed bearings in the uprights E and E′, as shown clearly in Fig. 3, both rolls being cast hollow, with one end closed, as represented in Fig. 3. The lower roll has one of its journals prolonged, so as to protrude through the upright E′ far enough to permit a crank to be attached to it, as shown in Figs. 1 and 3. These rolls are to be heated when in use by the insertion of a heated iron, F, as represented in Fig. 3, in which the lower roll only is shown thus filled, though in use both are to be thus provided.

To prevent the heat from escaping from the open ends of the rolls A and A′ they are each provided with a cap or lid, G, by which they ae closed after the heated iron is inserted. This lid may be formed in the shape of a plate, and hinged to the frame so as to shut over the open end of the roll where the roll does not protrude through or beyond the frame, as with the upper roll in Figs. 1, 2, and 3, or it may be hinged to the end of the roll itself where the latter protrudes, as shown with the lower roll in the same figures. It is obvious, however, that they may be made in the form of a cap or plug made to fit into the end of the rolls, or, when the rolls protrude, they may slip on over the end. When hinged, as shown, by a screw or pivot, *g*, they have a notch, *h*, cut in one edge, which engages on a pin as the cap is closed over the opening, so as to hold it shut, a small handle or knob, *g′*, being attached to each cap or lid G by which to open and close it. These caps or lids also serve to prevent the heat of the irom from affecting the hand of the operator when turning the crank of the machine. By this means, also, the heat being retained in the cylinders or rolls much longer than it would be if left open, it follows, of course, that it will not be necessary to stop and replace the irons F near as often as otherwise would be the case.

By this method of constructing the machine and arranging its parts the difficulties heretofore existing in this class of machines are obviated, and a very simple, cheap, and efficient machine is produced.

An important feature of my machine, in combination with the unobstructed passage-way for the fabric at right angles to the plane of the axes of the rolls and between their outer ends, is the central bearing or point of resistance of the upper or movable roll at the end of the bar D, which causes both ends of said roll to bear against the fixed roll with equal pressure, and prevents one end from springing away more than the other. In all machines in which the movable roll has its bearing or point of resistance at one end only, the other end tends to spring away from the fixed roll, causing it to make shallower and broader corrugations in the fabric at that end than at the other, and the fabric to pass through the rolls faster at one end than at the other, and to assume a form somewhat like that of a partially-opened fan.

Having thus fully described my invention, what I claim is—

1. In a fluting-machine, the combination, substantially as described, of two rolls, one mounted in fixed and the other in movable bearings, said movable roll being held against the other by a centrally-exerted elastic pressure, whereby any tendency of said movable roll to spring away from the other at either end more than at its opposite end is prevented, and said rolls being mounted in a frame so constructed as to leave an unobstructed passage-way for the introduction of a fabric in a line parallel with the rolls, and for its passage through them at right angles to their axes, substantially as set forth.

2. The rigid arm or support D centrally overhanging the two rolls, in combination with the movable roll and connecting mechanism, substantially as described, whereby the movable roll may be raised and lowered and an unobstructed passage-way provided for the fabric, as set forth.

3. In combination with the fluted rolls A A′, one being fixed and the other movable, both supported in bearings at each end, and the movable roll having a central bearing or point of resistance, and said rolls being so arranged as to leave an unobstructed opening between their outer ends for the introduction of the fabric, the spring-bar B, arranged to operate substantially as described.

S. G. CABELL.

Witnesses:

VINTON COOMBS,
JAMES L. NORRIS.